US012665959B2

(12) United States Patent
Gao

(10) Patent No.: US 12,665,959 B2
(45) Date of Patent: Jun. 23, 2026

(54) COMMUNICATION METHOD AND SYSTEM, DEVICE, AND COMPUTER-READABLE STORAGE MEDIUM

(71) Applicant: Huawei Technologies Co., Ltd., Shenzhen (CN)

(72) Inventor: Kuan Gao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 536 days.

(21) Appl. No.: 18/187,173

(22) Filed: Mar. 21, 2023

(65) Prior Publication Data

US 2023/0231940 A1 Jul. 20, 2023

Related U.S. Application Data

(63) Continuation of application No. PCT/CN2021/117847, filed on Sep. 11, 2021.

(30) Foreign Application Priority Data

Sep. 22, 2020 (CN) .......................... 202011003324.2

(51) Int. Cl.
| | |
|---|---|
| *H04L 69/22* | (2022.01) |
| *H04L 69/06* | (2022.01) |
| *H04L 69/18* | (2022.01) |

(52) U.S. Cl.
CPC .............. *H04L 69/22* (2013.01); *H04L 69/06* (2013.01); *H04L 69/18* (2013.01)

(58) Field of Classification Search
CPC ......... H04L 69/22; H04L 69/06; H04L 69/18; H04L 67/12; G06F 13/4265; G06F 13/4282
See application file for complete search history.

(56) References Cited

U.S. PATENT DOCUMENTS

2005/0157738 A1 7/2005 Vangal et al.
2013/0031276 A1* 1/2013 Rathi ...................... H04L 69/18
710/8

(Continued)

FOREIGN PATENT DOCUMENTS

CN 1706139 A 12/2005
CN 101459654 A 6/2009

(Continued)

OTHER PUBLICATIONS

Song, Ya et al., "RS422 bus communication data management and analysis method", Information and Communications, Editorial Office , Issue Jun. 2020, with an English abstract, 4 pages.

*Primary Examiner* — Schquita D Goodwin
(74) *Attorney, Agent, or Firm* — Slater Matsil, LLP

(57) ABSTRACT

A communication method is applied to a first device and a second device. The first device and the second device implement data communication through a target signal cable. The method includes: The first device constructs to-be-sent multi-bit target data into at least one target data packet based on a preset format, where each target data packet includes at least one bit of target data and multi-bit identification data, and the multi-bit identification data in each target data packet is used to indicate a quantity and locations of target data in a corresponding target data packet. The first device packs each bit of data in the at least one target data packet, so that different data has different signal waveforms after being packed. The first device sequentially sends each bit of packed data to the second device through the target signal cable.

20 Claims, 7 Drawing Sheets

(56)         References Cited

U.S. PATENT DOCUMENTS

| | | | |
|---|---|---|---|
| 2013/0278234 A1* | 10/2013 | Krellner | H02M 3/1584 |
| | | | 323/282 |
| 2018/0048714 A1* | 2/2018 | Kanai | H04L 69/18 |
| 2018/0225230 A1* | 8/2018 | Litichever | G06F 21/56 |
| 2018/0246835 A1* | 8/2018 | Lu | G06F 13/4282 |
| 2018/0278521 A1 | 9/2018 | Pfister et al. | |
| 2020/0050575 A1* | 2/2020 | Mishra | G06F 13/4282 |
| 2020/0259896 A1* | 8/2020 | Sachs | H04L 67/12 |
| 2021/0286744 A1* | 9/2021 | Norton | G06F 13/4282 |
| 2022/0093068 A1* | 3/2022 | Yokoyama | G10H 1/0066 |

FOREIGN PATENT DOCUMENTS

| | | |
|---|---|---|
| CN | 110244604 A | 9/2019 |
| CN | 110247734 A | 9/2019 |
| CN | 110659232 A | 1/2020 |
| CN | 111090268 A | 5/2020 |
| WO | 2005057881 A1 | 6/2005 |

* cited by examiner

COMMUNICATION METHOD AND SYSTEM, DEVICE, AND COMPUTER-READABLE STORAGE MEDIUM

CROSS-REFERENCE TO RELATED APPLICATIONS

This is a continuation of International Patent Application No. PCT/CN2021/117847, filed on Sep. 11, 2021, which claims priority to Chinese Patent Application No. 202011003324.2, filed on Sep. 22, 2020. The disclosures of the aforementioned applications are hereby incorporated by reference in their entireties.

TECHNICAL FIELD

This application relates to the field of communication technologies, and in particular, to a communication method and system, a communication device, and a computer-readable storage medium.

BACKGROUND

With rapid development of cloud computing, people have increasingly high requirements for functions and performance of server products, which results in more complex server configuration, and a larger scale of a server board. In this case, to save hardware resources and reduce hardware resource costs, a serial communication manner, for example, a serial universal input and output (SGPIO) protocol, is usually used in signal transmission between different chips in a server. As shown in FIG. 1, four signal cables need to be configured for signal transmission between two chips that communicate based on an SGPIO protocol, and eight input/output (I/O) ports of the chips need to be occupied by the four signal cables. It is apparent that such configuration cannot well save hardware resources of the chip. Therefore, how to save hardware resources and reduce hardware costs when it is ensured that functions and performance of the server remain unchanged is still a problem that urgently needs to be resolved currently.

SUMMARY

This application discloses a communication method and system, a device, and a computer-readable storage medium. When the communication method is used for communication, hardware resources of a communication device can be effectively saved, thereby reducing hardware costs.

According to a first aspect, this application provides a communication method. The method is applied to data communication between a first device and a second device, the first device and the second device implement data communication through a target signal cable, and the method includes the following steps.

The first device constructs to-be-sent multi-bit target data into at least one target data packet based on a preset format, where each target data packet includes at least one bit of the target data and multi-bit identification data, and the multi-bit identification data in each target data packet is used to indicate a quantity and locations of target data in a corresponding target data packet.

The first device packs each bit of data in the at least one target data packet, so that different data has different signal waveforms after being packed.

The first device sequentially sends each bit of packed data to the second device through the target signal cable.

According to the method described in the first aspect, the first device constructs the multi-bit target data to be sent to the second device into the at least one target data packet based on the preset format, then packs each bit of the data in the at least one target data packet, and finally sends each bit of the packed data to the second device through the target signal cable, to implement data communication between the first device and the second device. It can be learned that, according to the foregoing method, only one signal cable (that is, the target signal cable) is required between the first device and the second device to implement data communication between the first device and the second device. Therefore, when the method is applied to a server product to implement data communication, hardware resources can be effectively saved, and hardware costs can be reduced.

In a possible implementation, when one bit of data in the at least one target data packet is binary data 0, in one data period, a signal waveform corresponding to the one bit of data includes a signal rising edge and a signal falling edge; and when one bit of data in the at least one target data packet is binary data 1, in one data period, a signal waveform corresponding to the one bit of data includes a signal rising edge and does not include a signal falling edge.

It can be learned that in one data period, binary data 0 and binary data 1 have different signal waveforms. In this case, the first device may pack one bit of data in one data period, so that different data has different signal waveforms after being packed, and the second device may determine, based on the signal waveform, whether data sent by the first device is binary data 0 or binary data 1.

In a possible implementation, the multi-bit identification data includes multi-bit first identification data and multi-bit second identification data, and the first identification data is different from the second identification data. The preset format includes: the target data packet includes a data packet header and at least one data segment, the data packet header includes consecutive multi-bit first identification data and at least one bit of the second identification data, each data segment in the at least one data segment includes at least one bit of the target data and at least one bit of the second identification data, and a quantity of the consecutive multi-bit first identification data in the data packet header is greater than a quantity of the at least one bit of the target data in each data segment.

It can be learned that when the target data packet is constructed in the foregoing preset manner, the data packet header may be distinguished from the data segment, so that the data packet header is unique. Therefore, when parsing the target data packet, the second device may determine a location of the data packet header based on uniqueness of the data packet header, and further determine a corresponding data segment and target data in the data segment, thereby implementing data communication between the first device and the second device.

In a possible implementation, the foregoing method is applied to data communication between chips, the first device includes a first chip, and the second device includes a second chip.

It can be learned that, by using the foregoing method, data communication can be implemented through only one signal cable. Therefore, when the foregoing method is applied to data communication between chips, hardware resources of the chips can be effectively saved, thereby reducing hardware costs.

In a possible implementation, the method is applied to determining whether a target signal cable between the first device and the second device is correctly connected. The multi-bit target data sent by the first device to the second device includes identification information of the target signal cable, and the identification information of the target signal cable is used to indicate the target signal cable, so that the second device can determine, based on the obtained identification information of the target signal cable, whether the target signal cable is correctly connected.

It can be learned that, by using the foregoing method, the first device may send the identification information of the target signal cable to the second device, so that the second device can effectively determine whether the target signal cable is correctly connected. When the second device determines that the target signal cable is incorrectly connected, the second device may send alarm information, so that a user can reconnect the target signal cable that is incorrectly connected in a timely manner, thereby improving security and accuracy of data communication.

According to a second aspect, this application provides a communication method. The method is applied to data communication between a first device and a second device, the first device and the second device implement data communication through a target signal cable, and the method includes the following steps.

The second device receives, through the target signal cable, each bit of packed data sent by the first device, and determines each bit of the data based on a signal waveform corresponding to each bit of the packed data, to obtain at least one target data packet.

The second device parses the at least one target data packet based on a preset format, to obtain multi-bit target data in the at least one target data packet.

According to the method described in the second aspect, each bit of the packed data has a different signal waveform. Therefore, the second device may determine, based on a signal waveform corresponding to a received bit of the packed data, each bit of the data sent by the first device to the second device, to obtain the at least one target data packet. Then, the second device may obtain, by parsing the at least one target data packet, the multi-bit target data included in the at least one target data packet, to implement data communication between the first device and the second device.

In a possible implementation, that the second device determines each bit of the data based on a signal waveform corresponding to each bit of the packed data includes: When the second device detects that the signal waveform corresponding to each bit of the packed data is on a rising edge, the second device starts timing, and collects data at a preset moment. When the second device collects a low level, the second device determines that the collected data is binary data 0. When the second device collects a high level, the second device determines that the collected data is binary data 1. In the foregoing manner, the second device can accurately obtain each bit of the data sent by the first device.

In a possible implementation, the foregoing method is applied to data communication between chips, the first device includes a first chip, and the second device includes a second chip.

In a possible implementation, the method is applied to determining whether the target signal cable between the first device and the second device is correctly connected, where the multi-bit target data includes identification information of the target signal cable, and the identification information of the target signal cable is used to indicate the target signal cable. After the second device obtains the multi-bit target data in the target data packet, the method further includes: The second device determines whether the identification information of the target signal cable included in the multi-bit target data matches preset information. When the identification information of the target signal cable matches the preset information, the second device determines that the target signal cable is correctly connected. When the identification information of the target signal cable does not match the preset information, the second device determines that the target signal cable is incorrectly connected.

According to a third aspect, this application provides a first device, where the first device and a second device implement data communication through a target signal cable, and the first device includes a data packet construction unit, a data packing unit, and a data transceiver unit.

The data packet construction unit is configured to construct to-be-sent multi-bit target data into at least one target data packet based on a preset format, where each target data packet includes at least one bit of the target data and multi-bit identification data, and the multi-bit identification data in each target data packet is used to indicate a quantity and locations of target data in a corresponding target data packet.

The data packing unit is configured to pack each bit of data in the at least one target data packet, so that different data has different signal waveforms after being packed.

The data transceiver unit is configured to sequentially send each bit of packed data to the second device through the target signal cable.

In a possible implementation, when one bit of data in the at least one target data packet is binary data 0, in one data period, a signal waveform corresponding to the one bit of data includes a signal rising edge and a signal falling edge; and when one bit of data in the at least one target data packet is binary data 1, in one data period, a signal waveform corresponding to the one bit of data includes a signal rising edge and does not include a signal falling edge.

In a possible implementation, the multi-bit identification data includes multi-bit first identification data and multi-bit second identification data, and the first identification data is different from the second identification data.

The preset format includes: The target data packet includes a data packet header and at least one data segment, the data packet header includes consecutive multi-bit first identification data and at least one bit of the second identification data, each data segment in the at least one data segment includes at least one bit of the target data and at least one bit of the second identification data, and a quantity of the consecutive multi-bit first identification data in the data packet header is greater than a quantity of the at least one bit of the target data in each data segment.

According to a fourth aspect, this application provides a second device, where a first device and the second device implement data communication through a target signal cable, and the second device includes a data transceiver unit and a data packet parsing unit.

The data transceiver unit is configured to: receive, through the target signal cable, each bit of packed data sent by the first device, and determine each bit of the data based on a signal waveform corresponding to each bit of the packed data, to obtain at least one target data packet.

The data packet parsing unit is configured to parse the at least one target data packet based on a preset format, to obtain the multi-bit target data in the at least one target data packet.

In a possible implementation, the data transceiver unit is specifically configured to: when it is detected that a signal waveform corresponding to each bit of the packed data is on a rising edge, start timing, and collect data at a preset moment; when a low level is collected, determine that the collected data is binary data 0; and when a high level is collected, determine that the collected data is binary data 1.

In a possible implementation, the first device includes a first chip, and the second device includes a second chip.

In a possible implementation, the second device further includes a determining unit. The determining unit is configured to: determine whether identification information of the target signal cable included in the multi-bit target data matches preset information, where the identification information of the target signal cable is used to indicate the target signal cable; when the identification information of the target signal cable matches the preset information, determine that the target signal cable is correctly connected; and when the identification information of the target signal cable does not match the preset information, determine that the target signal cable is incorrectly connected.

According to a fifth aspect, this application provides another first device. The first device includes a processor and a memory. The processor executes code in the memory to implement some or all steps described in the first aspect.

According to a sixth aspect, this application provides another second device. The second device includes a processor and a memory. The processor executes code in the memory to implement some or all steps described in the second aspect.

According to a seventh aspect, this application provides a computer-readable storage medium storing computer instructions, and the computer instructions are used to implement some or all steps described in the first aspect.

According to an eighth aspect, this application provides a computer-readable storage medium storing computer instructions, and the computer instructions are used to implement some or all steps described in the second aspect.

According to a ninth aspect, this application provides a communication system. The communication system includes a first device and a second device. The first device is configured to perform some or all steps described in the first aspect, and the second device is configured to perform some or all steps described in the second aspect.

BRIEF DESCRIPTION OF THE DRAWINGS

To describe technical solutions in embodiments of this application more clearly, the following briefly introduces the accompanying drawings for describing embodiments. It is clear that the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

The technical solutions according to embodiments of this application are clearly and completely described in the following with reference to the accompanying drawings. It is clear that the described embodiments are merely some but not all of embodiments of this application. All other embodiments obtained by a person of ordinary skill in the art based on embodiments of this application without creative efforts shall fall within the protection scope of the present application.

To facilitate understanding of the technical solutions provided in the embodiments of this application, an application scenario to which the embodiments of this application are applicable is first described: communication between chips, which may specifically include data transmission between chips, cable anti-misinsertion, hard disk lighting, and the like.

In recent years, rapid development of the cloud computing industry makes people have increasingly high requirements for functions and performance of a server product. As a result, server configuration becomes more complex, a scale of a server board becomes larger, and manufacturing costs of the server product becomes higher. Therefore, how to save hardware resources as much as possible and reduce hardware resource costs while ensuring that functions and performance of the server product remain unchanged is one of problems that urgently need to be resolved currently.

Figure 1:
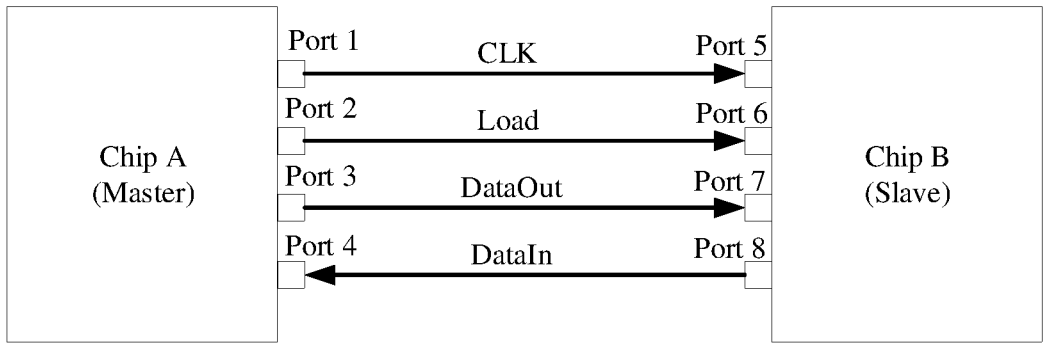
FIG. 1 is a topology diagram of the SGPIO protocol according to an embodiment of this application.

A communication manner between devices includes serial communication and parallel communication. Compared with parallel communication, serial communication has advantages such as a simple structure, fewer signal cables, easy to implement long-distance signal transmission, and low costs. Therefore, in a current server product, communication between different chips (for example, a complex programming logic device (CPLD)) in a server is usually implemented in a serial communication manner, for example, the SGPIO protocol. FIG. 1 shows a topology diagram of the SGPIO protocol. In FIG. 1, a chip A is a master device, and a chip B is a slave device. The chip A and the chip B communicate with each other by using the SGPIO protocol (that is, a group of SGPIO buses).

A group of SGPIO buses may specifically include four signal cables, which are respectively a clock cable, a signal loading cable, a data output cable, and a data input cable. The clock cable is configured to transmit a clock signal (CLK) sent from the chip A to the chip B, so that the chip A and the chip B can implement synchronous communication. The signal loading cable is configured to transmit a data loading and synchronization signal (Load) sent from the chip A to the chip B, where the data loading and synchronization signal is used to indicate that a frame of new data is to be transmitted. The data output cable is configured to transmit a data signal (DataOut) sent from the chip A to the chip B. The data input cable is configured to transmit the data signal (DataIn) sent from the chip B to the chip A.

It can be learned from FIG. 1 that the chip A is connected to one side of the four signal cables through four I/O ports (for example, a port 1 to a port 4), and the chip B is connected to the other side of the four signal cables through four I/O ports (for example, a port 5 to a port 8). In other words, the four I/O ports of the chip A and the four I/O ports of the chip B need to be occupied to implement communication between the chip A and the chip B. It may be understood that, in a case in which the chip A sends data to the chip B, but the chip B does not need to send data to the chip A, a quantity of signal cables included in the group of SGPIO buses may be correspondingly reduced to 3, that is, a clock cable, a signal loading cable, and a data output cable. However, in this case, three I/O ports of the chip A and three I/O ports of the chip B still need to be occupied. In general, the SGPIO bus occupies a large quantity of hardware resources (I/O resources). Therefore, the SGPIO protocol is not applicable to an application scenario in which I/O ports of the chip A and/or the chip B are insufficient.

Figure 2:
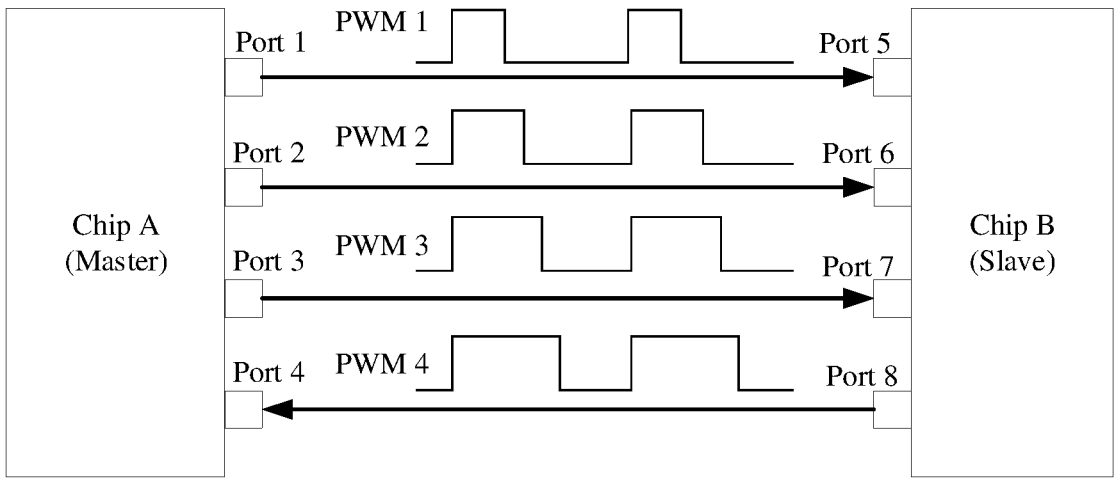
FIG. 2 is a schematic principle diagram of identifying whether a cable is correctly connected according to an embodiment of this application.

After the chip A and the chip B in FIG. 1 establish a connection through the SGPIO bus, data transmission may be implemented between the chip A and the chip B. However, to avoid an error in data transmission, before data transmission, it needs to be determined whether a signal cable between the chip A and the chip B is correctly connected. In order to save hardware resources of the chip A and the chip B, whether the cable is correctly connected is generally identified based on a waveform of a pulse width modulation (PWM) signal. FIG. 2 shows a schematic principle diagram of identifying whether a cable is correctly connected by using a PWM signal. In FIG. 2, a port 1 of a chip A sends a PWM signal (PWM 1) to a port 5 of a chip B through a clock cable, a port 2 of the chip A sends a PWM signal (PWM 2) to a port 6 of the chip B through a signal loading cable, a port 3 of the chip A sends a PWM signal (PWM 3) to a port 7 of the chip B through a data output cable, and a port 4 of the chip A sends a PWM signal (PWM 4) to a port 8 of the chip B through a data input cable. A duty cycle of the PWM 1 is 3/7, a duty cycle of the PWM 2 is 2/3, a duty cycle of the PWM 3 is 1, and a duty cycle of the PWM 4 is 3/2. Therefore, the chip B may determine, based on a duty cycle of a PWM signal sent by the chip A, whether a signal cable is correctly connected. Specifically, the clock cable is used as an example. After receiving the PWM 1 sent by the port 1 of the chip A, the port 5 of the chip B detects that the duty cycle of the PWM 1 is 3/7, and then determines whether the duty cycle of the PWM 1 is the same as a preset duty cycle. When the duty cycle of the PWM 1 is the same as the preset duty cycle, the chip B determines that the clock cable is correctly connected, that is, the clock cable is a cable connected between the port 1 of the chip A and the port 5 of the chip B. It should be understood that a manner in which the chip B determines whether the signal loading cable, the data output cable, and the data input cable are correctly connected is similar to the foregoing manner in which the chip B determines whether the clock cable is correctly connected, and details are not described herein again.

As shown in FIG. 2, whether the four signal cables are correctly connected is determined by using the four PWM signals with different duty cycles. Although this method can be used to determine whether a corresponding cable is correctly connected by using only one signal cable, this method is not applicable to a scenario in which there are too many cables. This is because a duty cycle of a PWM signal is roughly calculated, that is, data that can be carried on the PWM signal is limited and inaccurate. In an actual server product, the chip B may not only communicate with the chip A, but also may be connected to a plurality of other chips or devices. In this case, a large quantity of cables are inserted into the chip B (for example, the port 5), and the port 5 also receives a large quantity of PWM signals. After the port 5 receives these PWM signals, a plurality of approximately equal duty cycles may be obtained by calculating duty cycles of these PWM signals. In this case, the port 5 cannot accurately determine whether the cables corresponding to the PWM signals with approximately equal duty cycles are correctly connected. For example, the port 5 of the chip B receives two PWM signals whose duty cycles are approximately 3/7, where one is sent by the port 1 of the chip A, and the other is sent by a port 9 of a chip C. In this case, the chip B cannot determine whether the other end of the clock cable is connected to the port 1 of the chip A or connected to the port 9 of the chip C, and therefore cannot determine whether the clock cable is correctly connected.

Figure 3:
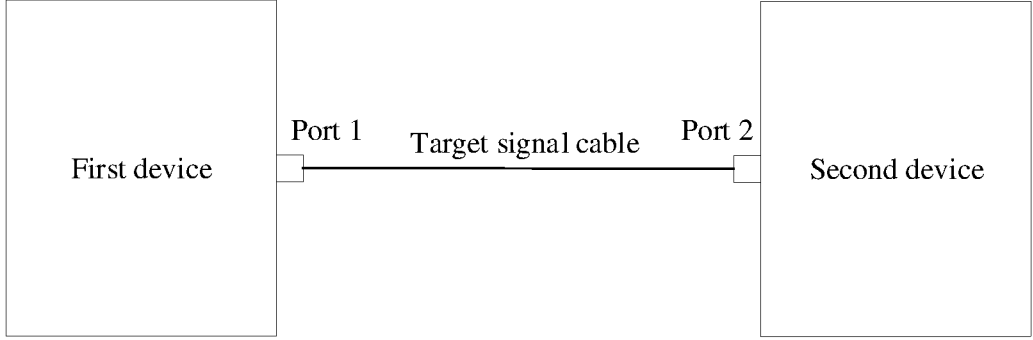
FIG. 3 is a topology diagram of a single-line asynchronous serial communication protocol according to an embodiment of this application.

To resolve the foregoing problem, an embodiment of this application provides a single-line asynchronous serial communication protocol. FIG. 3 shows a topology diagram of the single-line asynchronous serial communication protocol according to this embodiment of this application. It can be learned from FIG. 3 that the protocol can implement data communication between a first device and a second device through only one signal cable (target signal cable). Therefore, when data communication is performed by using the single-wire asynchronous serial communication protocol provided in this embodiment of this application, hardware resources can be effectively saved. In addition, when cable information is transmitted by using the single-wire asynchronous serial communication protocol provided in this embodiment of this application, it can be further effectively determined whether a cable (including the target signal cable) between the first device and the second device is correctly connected. To better understand the single-line asynchronous serial communication protocol provided in this embodiment of this application, the following describes the protocol in detail by using data communication between the first device and the second device in FIG. 3 as an example.

Figure 4:
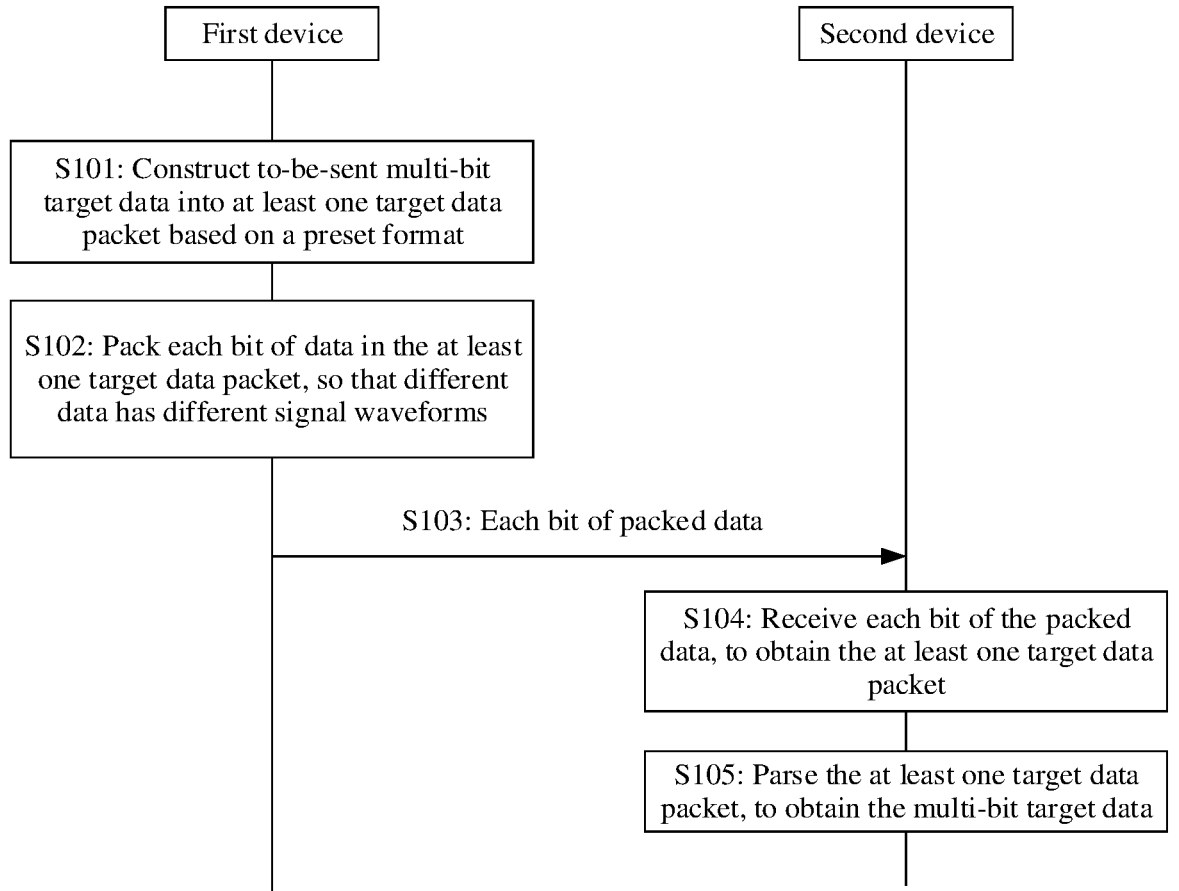
FIG. 4 is a schematic flowchart of a communication method according to an embodiment of this application.

FIG. 4 shows a schematic flowchart of a communication method according to an embodiment of this application. The communication method provided in this embodiment of this application includes but is not limited to the following steps.

S101: A first device constructs to-be-sent multi-bit target data into at least one target data packet based on a preset format.

The to-be-sent multi-bit target data is binary data, and specifically includes binary data 0 and binary data 1. Each target data packet in the at least one target data packet includes at least one bit of the target data and multi-bit identification data, and the multi-bit identification data in each target data packet is used to indicate a quantity and locations of target data in a corresponding target data.

In a specific embodiment, the multi-bit identification data includes multi-bit first identification data and multi-bit second identification data, and the first identification data is different from the second identification data.

In a specific embodiment, the preset format includes: The target data packet includes a data packet header and at least one data segment, the data packet header includes consecutive multi-bit first identification data and at least one bit of the second identification data, each data segment in the at least one data segment includes at least one bit of the target data and at least one bit of the second identification data, and a quantity of the consecutive multi-bit first identification data in the data packet header is greater than a quantity of the at least one bit of the target data in each data segment. It may be understood that, in the preset format designed in this application, an objective that the quantity of the consecutive multi-bit first identification data in the data packet header is greater than the quantity of the at least one bit of the target data in each data segment is as follows: In the target data packet, the data packet header may be distinguished from the data segment, so that the data packet header is unique. Therefore, when the target data packet is subsequently parsed, a location of the data packet header may be determined based on uniqueness of the data packet header, thereby determining a corresponding data segment and target data in the data segment.

Figure 5:
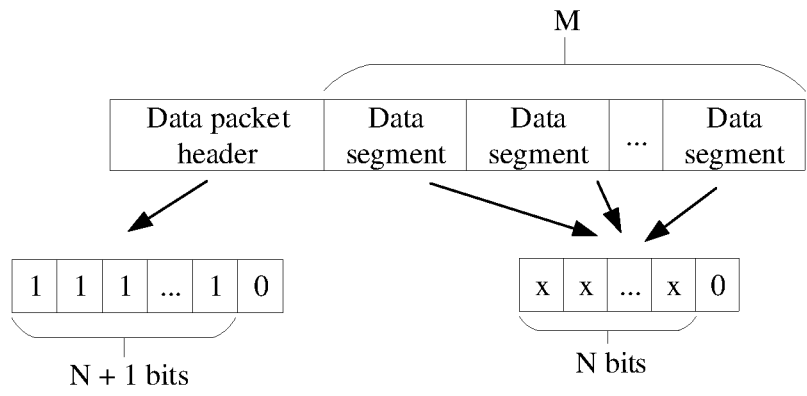
FIG. 5 is a schematic diagram of a possible preset format of a target data packet according to an embodiment of this application.

In a more specific embodiment, FIG. 5 is used as an example. FIG. 5 shows a possible preset format of a target data packet. In FIG. 5, the target data packet includes a data packet header and M data segments. The data packet header sequentially includes N+1 bits of consecutive binary data 1 and one bit of binary data 0 from left to right, and each data segment in the M data segments sequentially includes N bits of target data and one bit of binary data 0 from left to right. Both M and N are preset by a user, and both M and N are positive integers. For example, it is assumed that M=3 and N=4. The data packet header sequentially includes five bits of consecutive binary data 1 and one bit of binary data 0 from left to right, that is, "111110", and each data segment in the three data segments sequentially includes four bits of the target data and one bit of binary data 0 from left to right, that is, "xxxx0". In other words, the target data packet is "111110 xxxx0 xxxx0 xxxx0".

It may be understood that, FIG. 5 is used as an example. The first identification data is binary data 1, and the second identification data is binary data 0. In an actual application, the first identification data may also be binary data 0, and the second identification data may also be binary data 1. This is not specifically limited herein. For example, it is assumed that M=3 and N=4. The data packet header includes five bits of consecutive binary data 0 and one binary data 1 from left to right, that is, "000001", and each data segment in the three data segments sequentially includes four bits of the target data and one bit of binary data 1 from left to right, that is, "xxxx1". In other words, the target data packet is "000001 xxxx1 xxxx1 xxxx1".

In addition, FIG. 5 is used as an example. The data packet header includes N+1 bits of consecutive first identification data, and each data segment in the M data segments includes N bits of the target data. However, in an actual application, the quantity of the consecutive first identification data in the data packet header may also be N+K, which is not specifically limited herein. K>1, and K is a positive integer. For example, it is assumed that M=3, N=4, and K=2. The data packet header sequentially includes six bits of consecutive binary data 1 and one bit of binary data 0 from left to right, that is, "1111110", and each data segment in the three data segments sequentially includes four bits of the target data and one bit of binary data 0 from left to right, that is, "xxxx0". In other words, the target data packet is "1111110 xxxx0 xxxx0 xxxx0".

Figure 6:
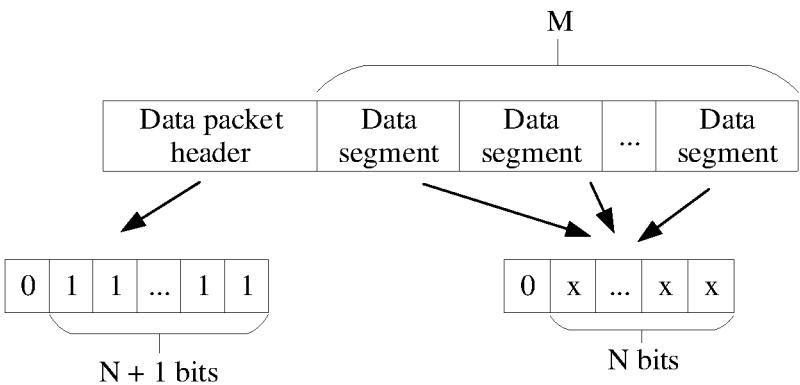
FIG. 6 is a schematic diagram of another possible preset format of a target data packet according to an embodiment of this application.

Optionally, FIG. 6 is used as an example. A preset structure of the target data packet may also be that the target data packet includes a data packet header and M data segments. The data packet header sequentially includes N+1 bits of consecutive binary data 1 and one bit of binary data 0 from right to left, and each data segment in the M data segments sequentially includes N bits of target data and one bit of binary data 0 from right to left. Both M and N are preset by the user, and both M and N are positive integers. For example, it is assumed that M=3 and N=4. The data packet header sequentially includes five bits of consecutive binary data 1 and one bit of binary data 0 from right to left, that is, "011111", and each data segment in the three data segments sequentially includes four bits of target data and one bit of binary data 0 from right to left, that is, "0xxxx". In other words, the target data packet is "011111 0xxxx 0xxxx 0xxxx".

It may be understood that, FIG. 6 is used as an example. The first identification data is binary data 1, and the second identification data is binary data 0. In an actual application, the first identification data may also be binary data 0, and the second identification data may also be binary data 1, which is not specifically limited herein. For example, it is assumed that M=3 and N=4. The data packet header sequentially includes five bits of consecutive binary data 0 and one bit of binary data 1 from right to left, that is, "100000", and each data segment in the three data segments sequentially includes four bits of the target data and one bit of binary data 1 from right to left, that is, "1xxxx". In other words, the target data packet is "100000 1xxxx 1xxxx 1xxxx".

In addition, FIG. 6 is used as an example. The data packet header includes N+1 bits of consecutive first identification data, and each data segment in the M data segments includes N bits of the target data. However, in an actual application, the quantity of the consecutive first identification data in the data packet header may also be N+K, which is not specifically limited herein. K>1, and K is a positive integer. For example, it is assumed that M=3, N=4, and K=2. The data packet header sequentially includes six bits of consecutive binary data 1 and one bit of binary data 0 from right to left, that is, "0111111", and each data segment in the three data segments sequentially includes four bits of the target data and one bit of binary data 0 from right to left, that is, "0xxxx" In other words, the target data packet is "0111111 0xxxx 0xxxx 0xxxx".

S102: The first device packs each bit of data in the at least one target data packet, so that different data has different signal waveforms after being packed.

In a specific embodiment, when one bit of data in the at least one target data packet is binary data 0, in one data period, a signal waveform corresponding to the one bit of data includes a signal rising edge and a signal falling edge. When one bit of data in the at least one target data packet is binary data 1, in one data period, a signal waveform corresponding to the one bit of data includes a signal rising edge, and does not include a signal falling edge. Binary data 0 and binary data 1 have different signal waveforms in one data period, therefore, the first device may pack one bit of data in one data period, so that different data can have different signal waveforms after being packed.

Figure 7:
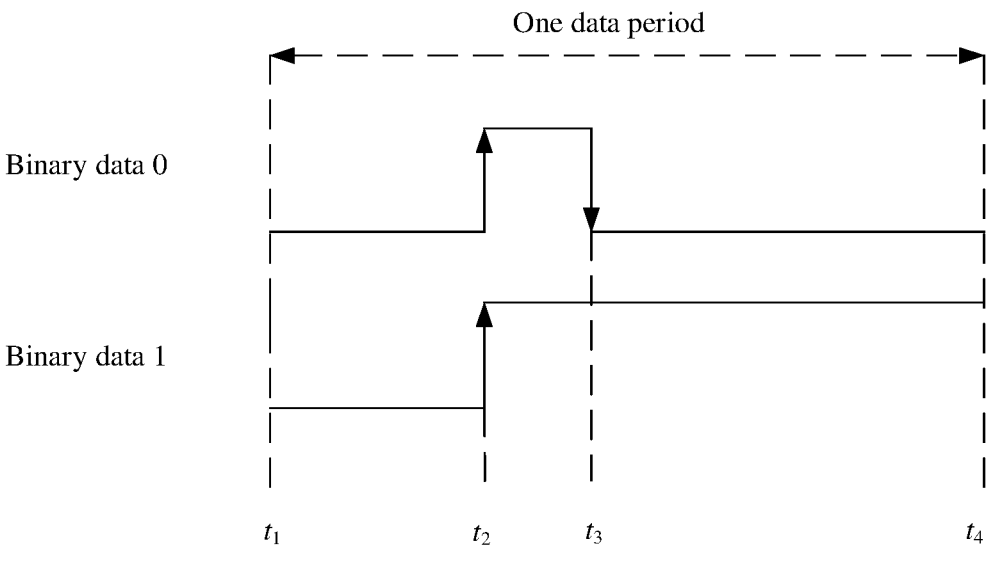
FIG. 7 is a schematic diagram of signal waveforms corresponding to different data in a same data period according to an embodiment of this application.

FIG. 7 shows a waveform corresponding to binary data 0 and a waveform corresponding to binary data 1 in one data period. It can be learned from FIG. 7 that binary data 0 and binary data 1 present different waveforms in one data period. Specifically, FIG. 7 is used as an example. One data period is a duration from a moment t1 to a moment t4. For binary data 0, a low-level signal is at the moment t1 to the moment t2, at the moment t2 the low level jumps to a high level (that is, a signal rising edge), the high-level signal is at the moment t2 to the moment t3 are, at the moment t3 the high level jumps to the low level (that is, a signal falling edge), and the low-level signal is at the moment t3 to the moment t4. In this case, in one data period, a signal waveform corresponding to binary data 0 includes a signal rising edge and a signal falling edge. For binary data 1, a low-level signal is at the moment t1 to the moment t2, at the moment t2 the low level jumps to a high level (that is, a signal rising edge), and the high-level signal is at the moment t2 to the moment t4. Therefore, in a data period, a signal waveform corresponding to binary data 0 includes a signal rising edge, but does not include a signal falling edge.

It should be noted that, in FIG. 7, in one data period, a signal rising edge exists in signal waveforms corresponding to binary data 0 and binary data 1. This is because: before the target signal cable starts to transmit data, the target signal cable is in a power-off idle state, which is equivalent to outputting a low level in this case, that is, a low level signal is at the moment t1 to the moment t2; and when the target signal cable starts to transmit data, the target signal cable is in a power-on working state, which is equivalent to outputting a high level in this case. Therefore, in one data period, both the signal waveform corresponding to binary data 0 and the signal waveform corresponding to binary data 1 jumps from a low level to a high level, that is, a signal rising edge occurs at the moment t2. It may be understood that, after the target signal cable transmits data, for transmission of binary data 0, it is equivalent to outputting a low level. Therefore, at the moment t3, a jump from a high level to a low level (that is, a signal falling edge) occurs, and a low level signal is at the moment t3 to the moment t4. For transmission of binary data 1, it is equivalent to outputting a high level. Therefore, a high level signal is at the moment t2 to the moment t4.

In a specific embodiment, the data period is preset by the user, and the data period may be obtained as follows: The user determines, based on internal master clocks of the first device and the second device, a working clock (referred to as a working clock) that can implement communication between the first device and the second device, and then determines that at least S working clocks are required to ensure that the signal waveform corresponding to binary data 0 is different from the signal waveform corresponding to binary data 1, that is, at least S working clocks are required to ensure that the signal waveform corresponding to binary data 0 includes a signal rising edge and a signal falling edge, and the signal waveform corresponding to binary data 1 includes a signal rising edge but does not include a signal falling edge. In this case, a value of one data period is equal to duration corresponding to the S working clocks, where S>0 and S is a positive integer. It should be noted that in an actual application, in order to ensure accuracy of data packing, in the S working clocks (that is, one data period), in addition to a signal rising edge and a signal falling edge, the signal waveform corresponding to binary data 0 should further include a waveform corresponding to a segment of low-level signals before the signal rising edge and a waveform corresponding to a segment of low-level signals after the signal falling edge. In addition to a signal rising edge, the waveform corresponding to binary data 1 should further include a waveform corresponding to a segment of low-level signals before the signal rising edge and a waveform corresponding to a segment of high-level signals after the signal rising edge. For details, refer to the data packing manner shown in FIG. 8 below.

Figure 8:
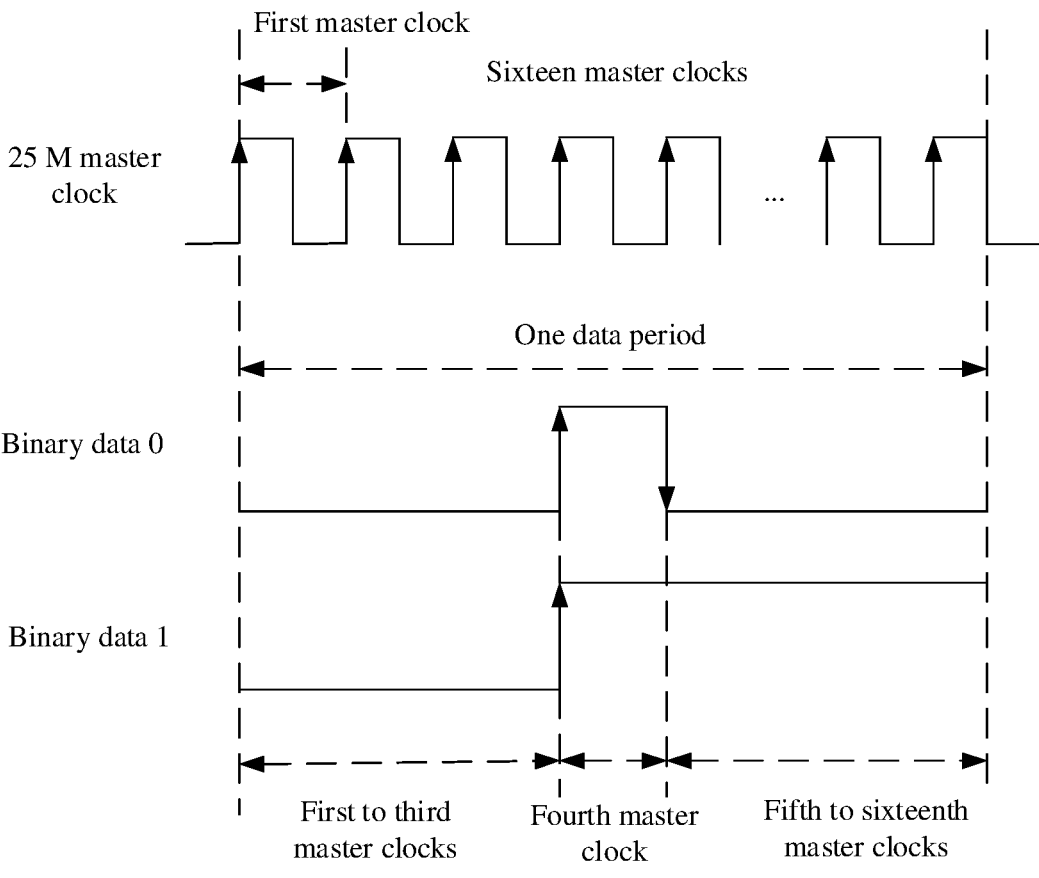
FIG. 8 is a schematic diagram of a data packing manner according to an embodiment of this application.

For example, it is assumed that the first device and the second device are CPLD chips, and an internal master clock of the CPLD chip is 25 mega Hertz (MHz). Therefore, the first device and the second device may use a 25 MHz internal master clock as a working clock for communication. It is found through testing that, as shown in FIG. 8, binary data 0 is at a low level in a first to third master clock period (that is, 25 MHz), is at a high level in a fourth master clock period, and is at a low level in a fifth to sixteenth master clock period; and binary data 1 is at a low level in a first to third master clock period, and is at a high level in a fourth to sixteenth master clock period. In this case, the first device may select 16 master clock periods as one data period, and one data period is 16/25M=0.64 μs. Therefore, the first device may pack one bit of data every 16 master clock periods. In this way, packed binary data 0 and the packed binary data 1 have different signal waveforms. It may be understood that packed binary data 0 is a signal whose duration is 0.64 μs. Packed binary data 1 is a signal whose duration is 0.64 μs.

It should be noted that, when the internal master clocks of the first device and the second device are the same, the internal master clocks of the first device and the second device may be selected as the working clocks. When the internal master clocks of the first device and the second device are different, the working clock of the first device may be approximately equal to the working clock of the second device in a frequency multiplication manner, and the approximately equal working clocks are used as the working clocks for communication between the first device and the second device. In this application, an objective of approximately equal or totally equal working clocks of the first device and the second device is: Because the first device packs one bit of data in one data period, the second device needs to collect one bit of data in one data period, so that the second device can accurately receive the data sent by the first device.

S103: The first device sequentially sends each bit of packed data to the second device through the target signal cable.

For binary data 0, packed binary data 0 is a signal segment including a signal rising edge and a signal falling edge. For binary data 1, packed binary data 1 is a signal that includes a signal rising edge but does not include a signal falling edge.

S104: The second device receives, through the target signal cable, each bit of the packed data sent by the first device, and determines each bit of the data based on a signal waveform corresponding to each bit of the packed data, to obtain the at least one target data packet.

In a specific embodiment, any bit of the packed data sent by the first device is used as an example. When the second device detects that a signal waveform corresponding to a bit of the packed data is on a rising edge, the second device starts timing, and collects data at a preset moment. When the second device collects a low level, the second device determines that the collected data is binary data 0. When the second device collects a high level, the second device determines that the collected data is binary data 1. In the foregoing manner, the second device may determine each bit of the data sent by the first device, to obtain the at least one target data packet.

In a specific embodiment, the preset moment is a preset working clock period. FIG. 8 is used as an example. The preset moment may be any one of the fifth master clock period to the sixteenth master clock period shown in FIG. 8. Specifically, when the second device detects a signal rising edge through the target signal cable, the second device starts the internal master clock to start timing, and starts collecting data after X master clock periods. If the second device collects a low level, the second device determines that the collected data is binary data 0, and if the second device collects a high level, the second device determines that the collected data is binary data 1. 2<X<13, and X is a positive integer. It may be understood that, when the second device detects a signal rising edge, the second device starts timing, that is, the second device starts timing from the fourth master clock period in FIG. 8. In this case, 2<X<13 is equivalent to any master clock period from the fifth master clock period to the sixteenth master clock period in FIG. 8.

S105: The second device parses the at least one target data packet based on a preset format, to obtain the multi-bit target data in the at least one target data packet.

In a specific implementation, after the first device sends all the at least one target data packet to the second device through the target signal cable, the second device obtains multi-bit data. Then, the second device determines, based on the preset format, which data in the multi-bit data forms a data packet header, to determine which data in the multi-bit data is target data.

In a specific embodiment, after obtaining the multi-bit data, the second device determines locations of a plurality of data packet headers in the multi-bit data based on consecutive multi-bit first identification data included in the data packet header in the preset format, and then determines each data segment in a corresponding target data packet and target data in each data segment based on a location of each data packet header, to obtain target data in each target data packet, and further obtain the multi-bit target data.

For example, it is assumed that the multi-bit data received by the second device is "111110 01010 10110 11100", a format of the target data packet is the structure shown in FIG. 5, M=3, and N=4. After receiving the multi-bit data, the second device first determines locations of five bits of consecutive binary data 1 in the multi-bit data, to determine a location of the data packet header and determine that the data packet header is "111110". Then, four bits of data after the data packet header are extracted, that is, target data "0101" in a first data segment, and it is determined that the first data segment is "01010". Then, four bits of data after the first data segment are extracted, that is, target data "1011" in a second data segment, and it is determined that the second data segment is "1010". Then, four bits of data after the second data segment is extracted, that is, target data "1110" in a third data segment, and it is determined that the third data segment is "11100". In this way, it is obtained that valid data in the target data packet is "0101 1011 1110".

In a specific embodiment, the communication method shown in FIG. 4 may be applied to data communication between chips. In this case, the first device includes a first chip, and the second device includes a second chip. A type of the first chip may be the same as that of the second chip. For example, both the first chip and the second chip are CPLD chips. A type of the first chip may be different from that of the second chip. For example, the first chip is a CPLD chip, and the second chip is a digital signal processing (DSP) chip. For a specific process of data communication between chips, refer to detailed description in step 11 to step 13 below.

In another specific embodiment, the communication method shown in FIG. 4 may be further applied to a cable anti-misinsertion scenario, that is, whether a target signal cable between the first device and the second device is correctly connected is determined. Optionally, the first device and the second device may be chips, boards, and the like. This is not specifically limited herein. For a specific process, refer to detailed description in step 21 to step 23 below.

The following separately describes, by using step 11 to step 13 and step 21 to step 23, two application scenarios of the communication method shown in FIG. 4.

Scenario 1: Implement Data Transmission Between Chips

Step 11: Design a board schematic diagram.

Specifically, one or two signal cables are designed between the first chip and the second chip based on a requirement for communication between the first chip and the second chip. When the first chip needs to send data to the second chip, but the second chip does not need to send data to the first chip, one signal cable may be designed between a chip A and a chip B. When the first chip and the second chip send data to each other, two signal cables may be designed between the first chip and the second chip. The first chip and the second chip may be disposed on a same board, or may be disposed on different boards, which is not specifically limited herein.

Step 12: Write logic code of the board.

Specifically, related code for data receiving and sending between the first chip and the second chip is written according to a communication protocol (including data packing, a data packet structure, data receiving, and the like) involved in the foregoing content.

Step 13: Prepare the board.

Specifically, after the board is manufactured based on the board schematic diagram, the written logic code is burnt into the first chip and the second chip based on a requirement.

Step 14: Test the board.

Specifically, a program is run to test and improve a signal waveform on a signal cable between the first chip and the second chip, to ensure that a hardware link between the first chip and the second chip is stable. Then, whether data communication between the first chip and the second chip is normal is verified by sending and receiving data (for example, determining whether sent data is consistent with received data). When data communication between the first chip and the second chip is normal, it indicates that data communication can be implemented between the first chip and the second chip.

Application Scenario 2: Implement Cable Anti-Misinsertion

Step 21: The first device sends the at least one target data packet to the second device.

The at least one target data packet includes the multi-bit target data, the multi-bit target data includes identification information of the target signal cable, and the identification information of the target signal cable is used to indicate the target signal cable. Optionally, the identification information of the target signal cable includes a cable number of the target signal cable.

Step 22: The second device receives the at least one target data packet sent by the first device, and parses the at least one target data packet to obtain the multi-bit target data included in the at least one target data packet.

Step 23: The second device determines whether the identification information of the target signal cable included in the multi-bit target data matches preset information. If the identification information of the target signal cable matches the preset information, the second device determines that the target signal cable is correctly connected; and if the identification information of the target signal cable does not match the preset information, the second device determines that the target signal cable is incorrectly connected.

The second device stores the preset information, the preset information includes identification information of at least one signal cable and connection information of the at least one signal cable, and the identification information of the at least one signal cable is in a one-to-one correspondence with the connection information of the at least one signal cable. Both identification information of a signal cable and connection information of a signal cable are used to indicate the signal cable. The identification information of the signal cable may be a cable number of the signal cable, and the connection information of the signal cable may include information about two ports connected to the signal cable, or may be information about one of the two ports connected to the signal cable (the port is not a port that stores the preset information on the second device). This is not specifically limited herein. The identification information of the at least one signal cable includes the identification information of the target signal cable, and the connection information of the at least one signal cable includes connection information of the target signal cable. Optionally, the connection information of the target signal cable includes information about a port 1 of the first device and information about a port 2 of the second device, or the connection information of the target signal cable is information about a port 1 of the first device. That the identification information of the target signal cable matches the preset information indicates that the identification information of the target signal cable is consistent with identification information of any signal cable in the preset information, and a port indicated by connection information of a corresponding signal cable includes the port 1 of the first device (a port that sends the identification information of the target signal cable).

In a specific embodiment, when the second device determines that the target signal cable is incorrectly connected, the second device may send alarm information, to notify the user that the target signal cable is incorrectly connected, so that the user can find that the target signal cable is incorrectly connected in a timely manner, and reconnect the target signal cable, and data communication between the first device and the second device is more accurate and secure.

For example, it is assumed that a number of a target cable is 0001. The preset format shown in FIG. 5 is used as an example. If M=1 and N=4, the data packet header of the target data packet is "111110", and the data segment is "00010", that is, the target data packet is "111110 00010". After the first device sends the target data packet to the second device through the target signal cable, the port 2 of the second device receives the target data packet, and obtains that the target data (that is, the number of the target signal cable) is "0001". The second device matches the target data with the preset information, and determines that the target data is consistent with the number of the target signal cable in the preset information, and that the target data is sent through the port 1 of the first device, which meets the connection information of the target signal cable in the preset information. In this case, the second device determines that the target signal cable is correctly connected.

It may be understood that, the foregoing step 21 to step 23 merely describe a method for determining whether a cable (that is, the target signal cable) between the first device and the second device is correctly connected. In an actual application, for another cable between the first device and the second device, whether the cable is correctly connected may also be determined by using the method described in step 21 to step 23. In particular, when there are too many cables (for example, 100 cables) between the first device and the second device, compared with the method for determining whether the cable is correctly connected shown in FIG. 2, whether all cables are correctly connected can be effectively and accurately determined by using the method described in step 21 to step 23, thereby implementing a function of cable anti-misinsertion.

The method in the embodiments of this application is described in detail in the foregoing content. To better implement the method provided in the embodiments of this application, the following describes a related device and a system that are provided in the embodiments of this application and that are used to cooperatively implement the foregoing method.

Figure 9:
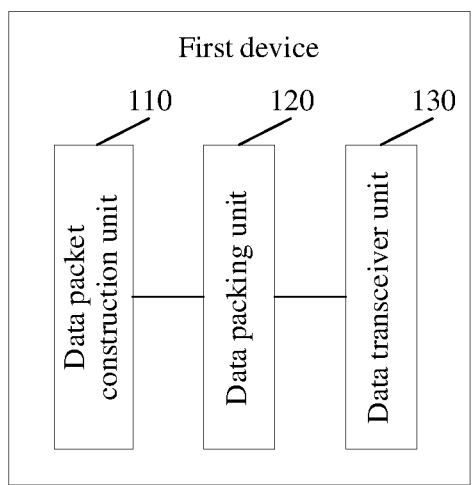
FIG. 9 is a schematic diagram of a structure of a first device according to an embodiment of this application.

FIG. 9 shows a schematic diagram of a structure of a first device according to an embodiment of this application. The first device includes a data packet construction unit 110, a data packing unit 120, and a data transceiver unit 130.

The data packet construction unit 110 is configured to construct to-be-sent multi-bit target data into at least one target data packet based on a preset format, where each target data packet includes at least one bit of the target data and multi-bit identification data, and the multi-bit identification data in each target data packet is used to indicate a quantity and locations of target data in a corresponding target data packet.

The data packing unit 120 is configured to pack each bit of data in the at least one target data packet, so that different data has different signal waveforms after being packed.

The data transceiver unit 130 is configured to sequentially send each bit of packed data to the second device through the target signal cable.

In a specific embodiment, when one bit of data in the at least one target data packet is binary data 0, in one data period, a signal waveform corresponding to the one bit of data includes a signal rising edge and a signal falling edge; and when one bit of data in the at least one target data packet is binary data 1, in one data period, a signal waveform corresponding to the one bit of data includes a signal rising edge and does not include a signal falling edge.

In a specific embodiment, the multi-bit identification data includes multi-bit first identification data and multi-bit second identification data, and the first identification data is different from the second identification data. The preset format includes: the target data packet includes a data packet header and at least one data segment, the data packet header includes consecutive multi-bit first identification data and at least one bit of the second identification data, each data segment in the at least one data segment includes at least one bit of the target data and at least one bit of the second identification data, and a quantity of the consecutive multi-bit first identification data in the data packet header is greater than a quantity of the at least one bit of the target data in each data segment.

In a specific embodiment, the first device may be a chip, or may be a board including a chip, and the like. This is not specifically limited herein. The second device may be a chip, or may be a board including a chip, and the like. This is not specifically limited herein. The first device and the second device may be a same device, or may be different devices.

For ease of description, the preset format, in this embodiment of this application, a signal waveform corresponding to each bit of the packed data, and the like are not described in detail. For details, refer to related content description in S101 and S102. Details are not described herein again. The foregoing embodiment also does not describe in detail a process in which the data packet construction unit 110 constructs the target data packet and a process in which the data packing unit 120 packs data in the first device. For details, refer to related description in S101 and S102. Details are not described herein again.

The first device in this embodiment of this application is described merely by using division of the foregoing functional modules as an example. In actual application, the foregoing functions may be allocated to different functional modules for implementation based on a requirement, that is, an internal structure of the first device is divided into different functional modules to implement all or some of the functions described above. In addition, the first device provided in the foregoing embodiment and the first device in the foregoing method embodiment belong to a same concept. For a specific implementation process, refer to the foregoing method embodiment. Details are not described herein again.

Figure 10:
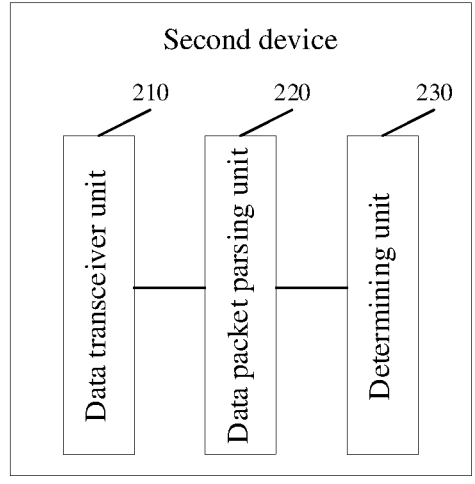
FIG. 10 is a schematic diagram of a structure of a second device according to an embodiment of this application.

FIG. 10 shows a schematic diagram of a structure of a second device according to an embodiment of this application. The second device includes a data transceiver unit 210 and a data packet parsing unit 220.

The data transceiver unit 210 is configured to receive, through a target signal cable, each bit of packed data sent by a first device, and determine each bit of the data based on a signal waveform corresponding to each bit of the packed data, to obtain at least one target data packet.

The data packet parsing unit 220 is configured to parse the at least one target data packet based on a preset format, to obtain multi-bit target data in the at least one target data packet.

In a specific embodiment, the data transceiver unit 210 is specifically configured to: when it is detected that a signal waveform corresponding to each bit of the packed data is on a rising edge, start timing, and collect data at a preset moment; when a low level is collected, determine that the collected data is binary data 0; and when a high level is collected, determine that the collected data is binary data 1.

In a possible implementation, the second device further includes a determining unit 230. The determining unit 230 is configured to: determine whether identification information of the target signal cable included in the multi-bit target data matches preset information, where the identification information of the target signal cable is used to indicate the target signal cable; when the identification information of the target signal cable matches the preset information, determine that the target signal cable is correctly connected; and when the identification information of the target signal cable does not match the preset information, determine that the target signal cable is incorrectly connected.

In a specific embodiment, the first device may be a chip, or may be a board including a chip, and the like. This is not specifically limited herein. The second device may be a chip, or may be a board including a chip, and the like. This is not specifically limited herein. The first device and the second device may be a same device, or may be different devices.

For ease of description, in this embodiment of this application, a signal waveform corresponding to each bit of the packed data, the preset format, the preset information, and the like are not described in detail. For details, refer to related content description in S101 and S102 and step 23. Details are not described herein again. The foregoing embodiment also does not describe in detail a process in which the data packet parsing unit 220 in the second device parses the target data packet. For details, refer to related description in S105. Details are not described herein again.

The second device in this embodiment of this application is described merely by using division of the foregoing functional modules as an example. In actual application, the foregoing functions may be allocated to different functional modules for implementation based on a requirement, that is, an internal structure of the second device is divided into different functional modules to implement all or some of the functions described above. In addition, the second device provided in the foregoing embodiment and the second device in the foregoing method embodiment belong to a same concept. For a specific implementation process, refer to the foregoing method embodiment. Details are not described herein again.

Figure 11:
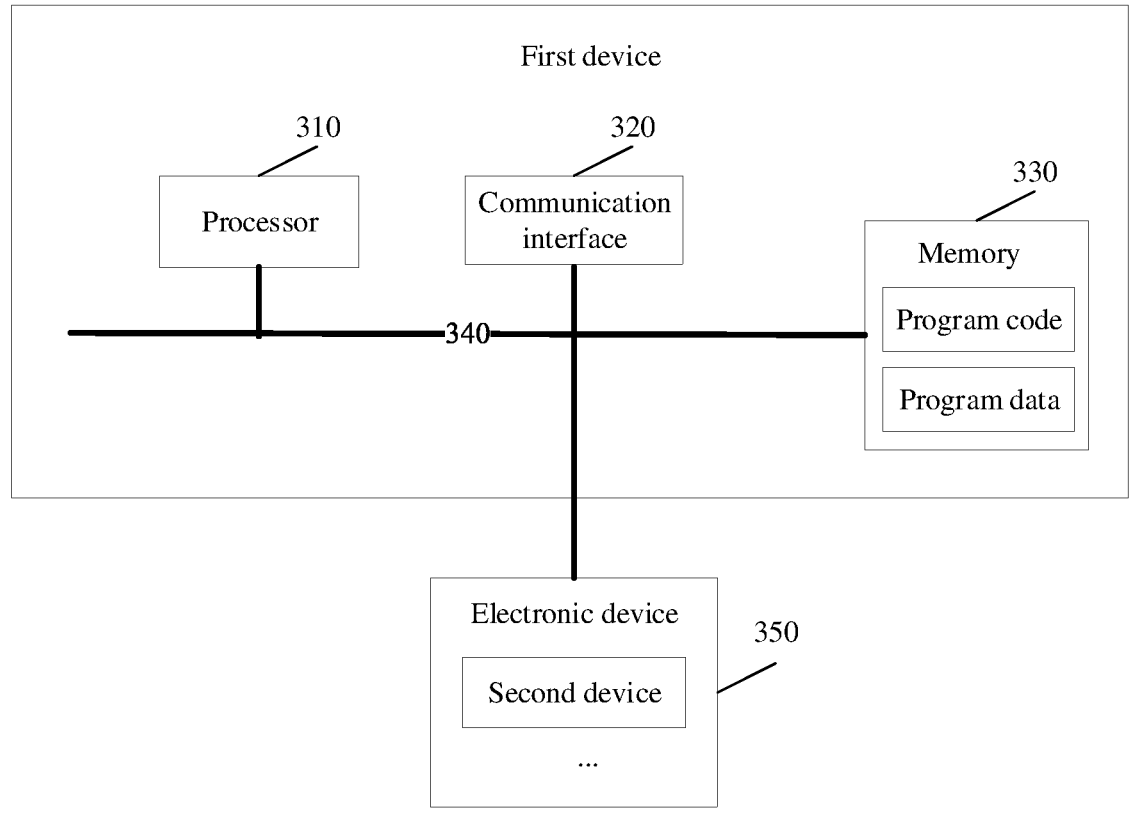
FIG. 11 is a schematic diagram of a structure of another first device according to an embodiment of this application.

FIG. 11 shows a schematic diagram of a structure of another first device according to an embodiment of this application. The first device includes a processor 310, a communication interface 320, and a memory 330. The processor 310, the communication interface 320, and the memory 330 are coupled through a bus 340.

The processor 310 may be a central processing unit (CPU), a general-purpose processor, a DSP, an application specific integrated circuit (ASIC), a field programmable gate array (FPGA) or another programmable logic device (PLD), a CPLD, a transistor logic device, a hardware component, or any combination thereof. The processor 310 may implement or perform various example methods described with reference to the embodiments of this application. Specifically, the processor 310 reads program code stored in the memory 330, and cooperates with the communication interface 320 to perform some or all steps of S101 to S103 and step 21.

The communication interface 320 may be a wired interface or a wireless interface, and is configured to communicate with another module or device. The wired interface may be an Ethernet interface, a controller area network interface, a local interconnect network (LIN) interface, or a FlexRay interface. The wireless interface may be a cellular network interface, a wireless local area network interface, and the like. Specifically, the communication interface 320 may be connected to another device. For example, the communication interface 320 may be connected to another electronic device 350 (for example, a second device), to implement data communication between the first device and the second device.

The memory 330 may include a volatile memory, for example, a random access memory (RAM). Alternatively, the memory 330 may include a non-volatile memory, for example, a read only memory (ROM), a flash memory, a hard disk drive (HDD), or a solid state drive (SSD). Alternatively, the memory 330 may include a combination of the foregoing types of memories. The memory 330 may store program code and program data. The program code includes code of some or all units in the first device shown in FIG. 9, for example, code of the data packet construction unit 110, code of the data packing unit 120, and code of the data transceiver unit 130. The program data is data generated in a process of running a program by the first device shown in FIG. 9, for example, the target data, the first identification data, and the second identification data.

The bus 340 may be a controller area network (CAN) or another implementation internal bus. The bus 340 may be classified into an address bus, a data bus, a control bus, and the like. For ease of representation, only one bold line is used to represent the bus in FIG. 11, but this does not mean that there is only one bus or only one type of bus.

The first device in this embodiment of this application is configured to perform the method performed by the first device in the foregoing method embodiment, and belongs to a same concept as the foregoing method embodiment. For a specific implementation process, refer to the foregoing method embodiment. Details are not described herein again.

Figure 12:
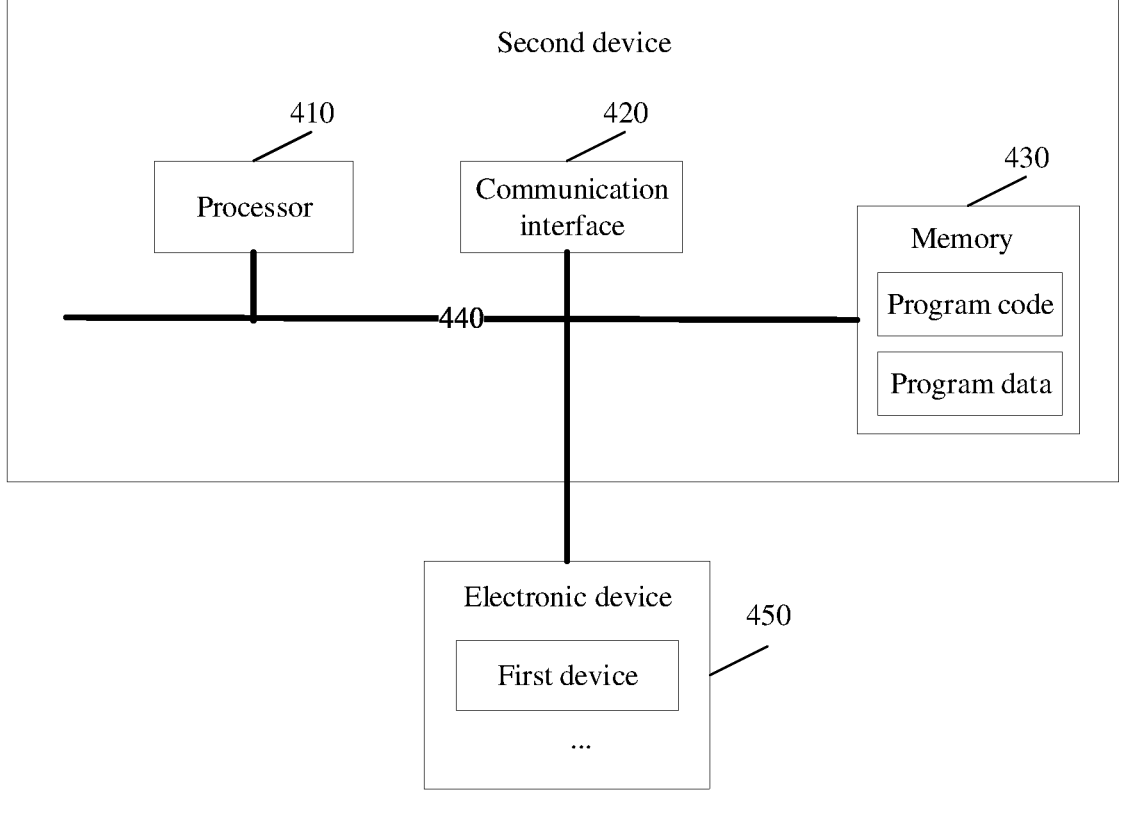
FIG. 12 is a schematic diagram of a structure of another second device according to an embodiment of this application.

FIG. 12 shows a schematic diagram of a structure of another second device according to an embodiment of this application. The second device includes a processor 410, a communication interface 420, and a memory 430. The processor 410, the communication interface 420, and the memory 430 are coupled through a bus 440.

The processor 410 may be a CPU, a general-purpose processor, a DSP, an ASIC, an FPGA, a PLD, a CPLD, a transistor logic device, a hardware component, or any combination thereof. The processor 410 may implement or perform various example methods that are described with reference to content disclosed in this application. Specifically, the processor 410 reads program code stored in the memory 430, and cooperates with the communication interface 420 to perform some or all of S104 and S105 and step 22 and step 23.

The communication interface 420 may be a wired interface or a wireless interface, and is configured to communicate with another module or device. The wired interface may be an Ethernet interface, a controller area network interface, an LIN, or a FlexRay interface. The wireless interface may be a cellular network interface, a wireless local area network interface, and the like. Specifically, the communication interface 420 may be connected to another electronic device 450 (for example, a first device), to implement data communication between the first device and the second device.

The memory 430 may include a volatile memory, for example, a RAM. The memory 430 may also include a non-volatile memory, for example, a ROM, a flash memory, an HDD, or an SSD. The memory 430 may further include a combination of the foregoing types of memories. The memory 430 may store program code and program data. The program code includes code of some or all units in the second device shown in FIG. 10, for example, code of the data transceiver unit 210, code of the data packet parsing unit 220, and code of the determining unit 230. The program data is data generated by the second device in a process of running a program shown in FIG. 10, for example, the target data, the first identification data, the second identification data, and the preset information.

The bus 440 may be a CAN or another implementation internal bus. The bus 440 may be classified into an address bus, a data bus, a control bus, and the like. For ease of representation, only one bold line is used to represent the bus in FIG. 12, but this does not mean that there is only one bus or only one type of bus.

The second device in this embodiment of this application is configured to perform the method performed by the second device in the foregoing method embodiment, and belongs to a same concept as the foregoing method embodiment. For a specific implementation process, refer to the foregoing method embodiment. Details are not described herein again.

Figure 13:
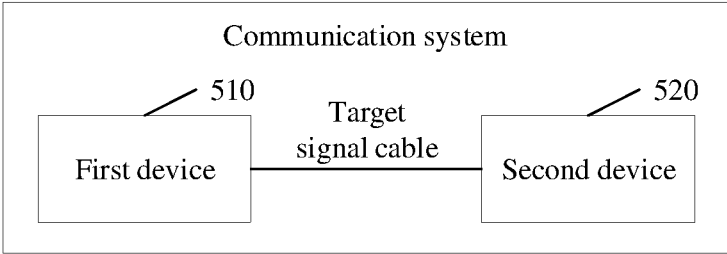
FIG. 13 is a schematic diagram of a structure of a communication system according to an embodiment of this application.

An embodiment of this application further provides a communication system. The communication system shown in FIG. 13 includes a first device 510 and a second device 520. The first device 510 and the second device 520 are connected through a target signal cable. The first device 510 may be the first device shown in FIG. 9, or may be the first device shown in FIG. 11. The first device 510 is configured to perform the method performed by the first device in the foregoing method embodiments. For a specific implementation process of the first device 510, refer to the foregoing method embodiments. Details are not described herein again. The second device 520 may be the second device shown in FIG. 10, or may be the second device shown in FIG. 12. The second device 520 is configured to perform the method performed by the second device in the foregoing method embodiments. For a specific implementation process of the second device 520, refer to the foregoing method embodiments. Details are not described herein again.

This application further provides a computer-readable storage medium. The computer-readable storage medium stores computer instructions. When the computer instructions run on a computing device (for example, the first device shown in FIG. 9 or FIG. 11), the computing device is enabled to perform the method performed by the first device in the foregoing method embodiments.

This application further provides another computer-readable storage medium. The computer-readable storage medium stores computer instructions, and when the computer instructions run on a computing device (for example, the second device shown in FIG. 10 or FIG. 12), the computing device is enabled to perform the method performed by the second device in the foregoing method embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or a wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a storage disk, or a magnetic tape), an optical medium (for example, a DVD), a semiconductor medium (for example, an SSD), and the like. In the foregoing embodiments, the description of each embodiment has respective focuses. For a part that is not described in detail in an embodiment, refer to related description in other embodiments.

In the several embodiments provided in this application, it should be understood that the disclosed apparatuses may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, and the like) to perform all or a part of the steps of the methods described in embodiments of this application. The foregoing storage medium may include: any medium that can store program code, such as a USB flash disk, a removable hard disk, a read-only memory, a random access memory, a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
constructing, by a first device, multi-bit target data into at least one target data packet based on a preset format, wherein each target data packet of the at least one target data packet comprises at least one bit of the multi-bit target data and multi-bit identification data, and the multi-bit identification data in each target data packet indicates a quantity and locations of target data in a corresponding target data packet;
packing, by the first device, each bit of data in the at least one target data packet in a manner that different data has different signal waveforms after being packed, to obtain packed data; and
sequentially sending, by the first device, each bit of the packed data to a second device through a single target signal line, wherein the single target signal line connects an input/output port of the first device to an input/output port of the second device and excludes transmission of a clock signal.

2. The method according to claim 1, wherein:
when a bit of data in the at least one target data packet is binary data 0, in a data period, a signal waveform corresponding to the bit of data comprises a signal rising edge and a signal falling edge; and
when a bit of data in the at least one target data packet is binary data 1, in a data period, a signal waveform corresponding to the bit of data comprises a signal rising edge and does not comprise a signal falling edge.

3. The method according to claim 1, wherein at least one multi-bit identification data comprises multi-bit first identification data and multi-bit second identification data, and the multi-bit first identification data is different from the multi-bit second identification data; and
wherein the preset format comprises: each target data packet of the at least one target data packet comprises a data packet header and at least one data segment, the data packet header of a respective target data packet comprises consecutive multi-bit first identification data and at least one bit of the multi-bit second identification data, each data segment in the at least one data segment of the respective target data packet comprises at least one bit of the target data and at least one bit of the multi-bit second identification data, and a quantity of the consecutive multi-bit first identification data in the data packet header of the respective target data packet is greater than a quantity of the at least one bit of the target data in each data segment of the respective target data packet.

4. The method according to claim 1, further comprising:
receiving, by the second device through the single target signal line, each bit of the packed data sent by the first device, and determining each bit of the packed data based on a signal waveform corresponding to each bit of the packed data, to obtain the at least one target data packet; and
parsing, by the second device, the at least one target data packet based on the preset format, to obtain the multi-bit target data.

5. The method according to claim 4, wherein determining each bit of the packed data based on the signal waveform corresponding to each bit of the packed data comprises:
when the second device detects that the signal waveform corresponding to each bit of the packed data is on a rising edge, starting, by the second device, timing, and collecting data at a preset moment;
when the second device collects a low level, determining, by the second device, that the collected data is binary data 0; and
when the second device collects a high level, determining, by the second device, that the collected data is binary data 1.

6. The method according to claim 1, wherein the method is applied to data communication between chips, the first device comprises a first chip, and the second device comprises a second chip.

7. The method according to claim 1, wherein the method is applied to determining whether the single target signal line is correctly connected, the multi-bit target data comprises identification information of the single target signal line, the identification information of the single target signal line indicates the single target signal line, and after the second device obtains the multi-bit target data in the target data packet, the method further comprises:
determining, by the second device, whether the identification information of the single target signal line comprised in the multi-bit target data matches preset information;
when the identification information of the single target signal line matches the preset information, determining, by the second device, that the single target signal line is correctly connected; and
when the identification information of the single target signal line does not match the preset information, determining, by the second device, that the single target signal line is incorrectly connected.

8. A device, comprising:
a processor; and a memory, wherein the processor is configured to execute code stored in the memory, and executing the code causes the device to perform the following:

constructing multi-bit target data into at least one target data packet based on a preset format, wherein each target data packet comprises at least one bit of the multi-bit target data and multi-bit identification data, and the multi-bit identification data in each target data packet of the at least one target data packet indicates a quantity and locations of target data in a corresponding target data packet;

packing each bit of data in the at least one target data packet in a manner that different data has different signal waveforms after being packed, to obtain packed data; and sequentially sending each bit of the packed data to a second device through a single target signal line, wherein the single target signal line connects an input/output port of the device to an input/output port of the second device and excludes transmission of a clock signal.

9. The device of claim 8, wherein:

when a bit of data in the at least one target data packet is binary data 0, in a data period, a signal waveform corresponding to the bit of data comprises a signal rising edge and a signal falling edge; and when a bit of data in the at least one target data packet is binary data 1, in a data period, a signal waveform corresponding to the bit of data comprises a signal rising edge and does not comprise a signal falling edge.

10. The device of claim 8, wherein the multi-bit identification data comprises multi-bit first identification data and multi-bit second identification data, and the multi-bit first identification data is different from the multi-bit second identification data; and the preset format comprises: each target data packet of the at least one target data packet comprises a data packet header and at least one data segment, the data packet header of a respective target data packet comprises consecutive multi-bit first identification data and at least one bit of the multi-bit second identification data, each data segment in the at least one data segment of the respective target data packet comprises at least one bit of the target data and at least one bit of the multi-bit second identification data, and a quantity of the consecutive multi-bit first identification data in the data packet header of the respective target data packet is greater than a quantity of the at least one bit of the target data in each data segment of the respective target data packet.

11. A system, comprising:

a first device; and a second device;

wherein the first device is configured to:

construct multi-bit target data into at least one target data packet based on a preset format, wherein each target data packet in the at least one target data packet comprises at least one bit of the multi-bit target data and multi-bit identification data, and the multi-bit identification data in each target data packet indicates a quantity and locations of target data in a corresponding target data packet;

pack each bit of data in the at least one target data packet in a manner that different data has different signal waveforms after being packed, to obtain packed data; and sequentially send each bit of the packed data to the second device through a single target signal line, wherein the single target signal line connects an input/output port of the first device to an input/output port of the second device and excludes transmission of a clock signal.

12. The system of claim 11, wherein:

when a bit of data in the at least one target data packet is binary data 0, in a data period, a signal waveform corresponding to the bit of data comprises a signal rising edge and a signal falling edge; and when a bit of data in the at least one target data packet is binary data 1, in a data period, a signal waveform corresponding to the bit of data comprises a signal rising edge and does not comprise a signal falling edge.

13. The system of claim 11, wherein the multi-bit identification data comprises multi-bit first identification data and multi-bit second identification data, and the multi-bit first identification data is different from the multi-bit second identification data; and wherein the preset format comprises: each target data packet in the at least one target data packet comprises a data packet header and at least one data segment, the data packet header of a respective target data packet comprises consecutive multi-bit first identification data and at least one bit of the multi-bit second identification data, each data segment in the at least one data segment of the respective target data packet comprises at least one bit of the target data and at least one bit of the multi-bit second identification data, and a quantity of the consecutive multi-bit first identification data in the data packet header of the respective target data packet is greater than a quantity of the at least one bit of the target data in each data segment of the respective target data packet.

14. The system of claim 11, wherein the second device is configured to:

receive, through the single target signal line, each bit of the packed data sent by the first device, and determining each bit of the data based on a signal waveform corresponding to each bit of the packed data, to obtain the at least one target data packet; and parse the at least one target data packet based on the preset format, to obtain the multi-bit target data.

15. The system of claim 14, wherein the second device is configured to:

when the second device detects that the signal waveform corresponding to each bit of the packed data is on a rising edge, start timing, and collect data at a preset moment;

when the second device collects a low level, determine the collected data is binary data 0; and when the second device collects a high level, determine the collected data is binary data 1.

16. The system of claim 11, wherein the system is applied to determining whether the single target signal line is correctly connected, the multi-bit target data comprises identification information of the single target signal line, the identification information of the single target signal line indicates the single target signal line, and the second device is configured to:

determine whether the identification information of the single target signal line comprised in the multi-bit target data matches preset information;

when the identification information of the single target signal line matches the preset information, determine that the single target signal line is correctly connected; and when the identification information of the single target signal line does not match the preset information, determine that the single target signal line is incorrectly connected.

17. The system of claim 11, wherein the first device comprises a first chip, and the second device comprises a second chip.

18. The system of claim 17, wherein the first device and the second device each comprise a complex programming logic device (CPLD) chip.

19. The system of claim 18, wherein internal master clocks of the first device and the second device are the same.

20. The system of claim 18, wherein a first working clock of the first device is equal to a second working clock of the second device in a frequency multiplication manner, and the first working clock and the second working clock are used for communication between the first device and the second device.

\* \* \* \* \*